US006354783B1

(12) United States Patent
Stoy et al.

(10) Patent No.: US 6,354,783 B1
(45) Date of Patent: Mar. 12, 2002

(54) MEDICATION-HANDLING SYSTEM FOR USE IN LOADING MEDICATION CARTS

(75) Inventors: Michael A. Stoy; Ronald H. Wilson, both of Bothell, WA (US)

(73) Assignee: NextRx Corporation, Bothell, WA (US)

( * ) Notice: Subject to any disclaimer, the term of this patent is extended or adjusted under 35 U.S.C. 154(b) by 0 days.

(21) Appl. No.: 09/324,682

(22) Filed: Jun. 3, 1999

(51) Int. Cl.[7] .......................... B65G 67/04; B65G 67/08

(52) U.S. Cl. ....................... 414/398; 198/717; 414/397; 414/268; 221/10; 700/231

(58) Field of Search ................................ 414/268, 269, 414/397, 331.06, 331.09, 331.11, 528, 523, 400, 399, 572, 398, 299, 373; 198/717; 221/2, 10; 141/231; 700/213, 215, 231, 237; 706/10

(56) References Cited

U.S. PATENT DOCUMENTS 3,310,199 A * 3/1967 Roberts et al. ............... 221/25
4,546,901 A * 10/1985 Buttarazzi .................... 221/10
4,655,026 A * 4/1987 Wigoda .................. 700/235 X
5,092,730 A * 3/1992 Neri ...................... 414/331.04
5,348,061 A * 9/1994 Riley et al. ............. 221/129 X
5,431,299 A * 7/1995 Brewer et al. .......... 221/253 X
5,988,858 A * 11/1999 Yuyama et al. ............. 700/230

FOREIGN PATENT DOCUMENTS

GB 1009841 * 11/1965 ................. 414/397

* cited by examiner

*Primary Examiner*—Frank E. Werner
(74) *Attorney, Agent, or Firm*—Jensen & Puntigam, P.S.

(57) ABSTRACT

The system includes a medication-receiving assembly which collects medications automatically dispensed from storage assemblies therefor and a transport assembly for moving the collected medications to a loading assembly, wherein the loading assembly is arranged and positioned so that the medications move by gravity action from an upper end thereof, past a pair of opposing, angled deflectors which are individually controllable and which guide the medications into selected portions of a medication bin in a medication cart, which accommodates medications for a large number of patients, such as all the patients on a hospital ward. Supplemental medications not present in the storage assemblies can be provided with a hand-loaded supplemental doses assembly. The medication cart may then be moved directly to the ward and the bedside of the individual patients in turn.

18 Claims, 10 Drawing Sheets

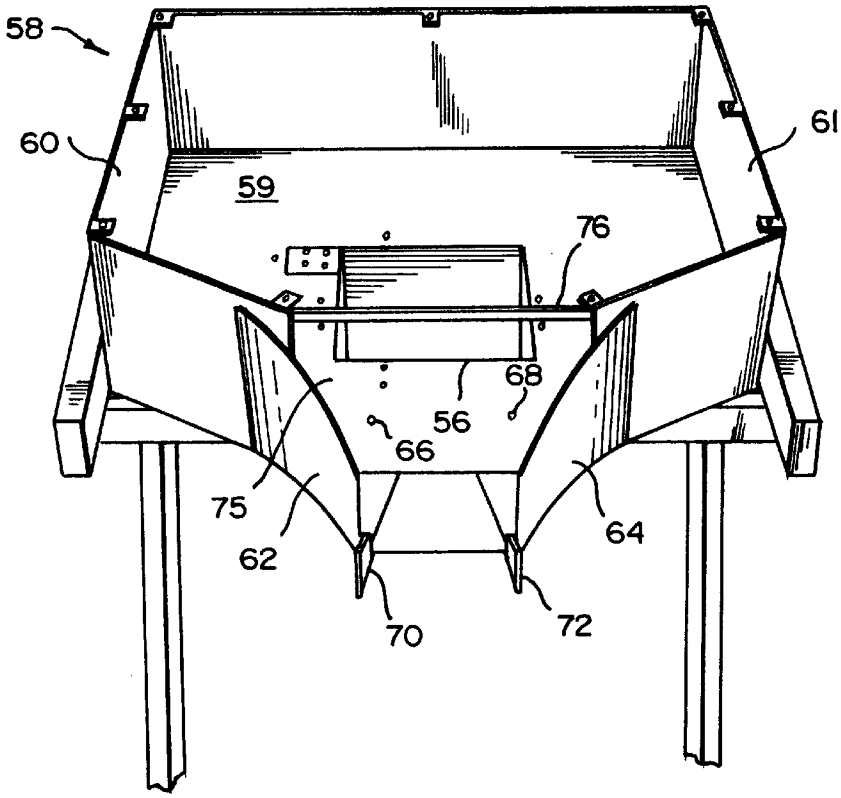
FIG. 11
FIG. 12
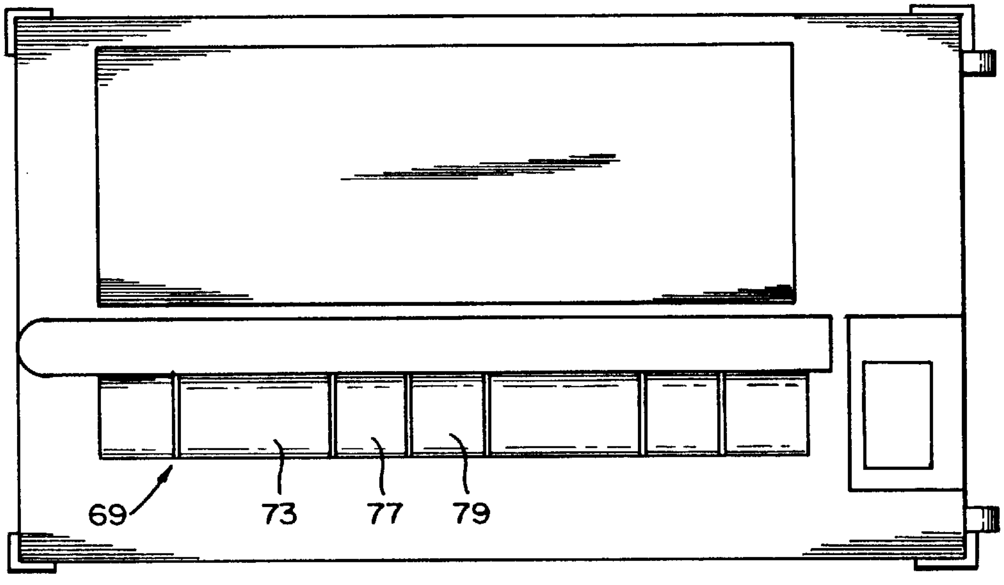

MEDICATION-HANDLING SYSTEM FOR USE IN LOADING MEDICATION CARTS

TECHNICAL FIELD

This invention relates generally to automatic medication-dispensing systems for use in health care facilities such as hospitals, and more specifically concerns a system for transporting and loading previously dispensed medications into patient bins in a medication cart.

BACKGROUND OF THE INVENTION

Providing correct medications in a timely manner to patients is an important, if not vital, function of health care facilities, such as hospitals and nursing homes. In most cases, the prescribed medications are picked (collected) by hand in a central pharmacy and distributed to the patients in the facility at specified times during the day. Delivery of medications to the patients is accomplished in various ways. In some cases, medications are provided to patients individually, while in other cases, medications for all patients in a particular location, such as a hospital ward, are delivered and administered from a single medication cart, which holds the medications for individual patients in separate bins or drawers in the cart. Such conventional dispensing and delivery systems are quite time-consuming and prone to errors. In particular, a substantial amount of professional time is inefficiently used in the filling and delivery of medications with such systems.

Various attempts have been made to automate various portions or even the entire medication dispensing and/or delivery process in an attempt to reduce the time involved and substantially reduce errors in the process.

The medication cart itself is often the focus of attention, with various arrangements, such as shown in U.S. Pat. No. 3,310,199 to Roberts et al, U.S. Pat. No. 5,011,240 to Kelley et al and U.S. Pat. No. 5,314,243 to McDonald et al, some of which include a plurality of patient-specific compartments. Some of these carts attempt to uniquely address individual drawers, which are assigned on a patient-by-patient basis, with various access protection arrangements. Such medication carts have had varying acceptance, although they still must typically be hand-loaded from a medication dispensing location, usually a central pharmacy, or in some cases, depending upon the particular facility, various satellite pharmacy stations which are in turn serviced by a central pharmacy.

In some systems, prescribed medications for individual patients are dispensed automatically on demand from a central dispensing apparatus which includes storage capability for a large number of medications. Many of these systems include software control features linking a hospital computer which has the medication records for all of the facility's patients. There is typically a wide variance in the sophistication and capability of such systems. One such system is shown in U.S. Pat. No. 4,546,901 to Butarazi, while other such systems are shown in U.S. Pat. No. 4,655,026 to Wigoda, U.S. Pat. No. 4,785,969 to McLaughlin and U.S. Pat. No. 4,487,764 to Halvorson. Such systems, while alleging improvement in filling time and error reduction, are often not commercially viable because of manufacturing expense and lack of operational reliability. Even the commercial systems are still subject to errors and are typically not fast enough to adequately service large facilities, in which medications must be provided to a large number of patients at least three times each day.

Hence, while systems which are capable of some form of automatic dispensing of medications on a patient-by-patient basis are available and are used in some health care facilities, there remains significant difficulties with respect to their everyday operation and reliability, and further, they do not provide fast, reliable transporting of the dispensed medications to the bedside of the patient. Even in those systems which have attempted to automate the entire medication dispensing/delivery process, it is this portion of such a system, i.e. the transporting/delivery of the medications, following the automatic dispensing of the medications, to the bedside of the patient, which continues to be time-consuming and, in many cases unreliable, subject to error.

Hence, it is desirable to have an integrated, easy to manage, reliable, automated system for transporting and loading medications in a medication cart after they have been initially dispensed from a central facility.

DISCLOSURE OF THE INVENTION

Accordingly, the present invention is a system for handling packaged medications which have been previously dispensed from a plurality of storage assemblies, comprising: a medication-receiving assembly for collecting medications which have been automatically dispensed from storage assemblies therefor; and means for transporting the collected medications to a medication loading assembly, the medication loading assembly being positioned relative to the transporting means and configured so that the packaged medications move by gravity out of a lower end of the loading assembly to a medication receptacle, such as a bin in a medication cart, the lower end of the loading assembly being configured to guide the packaged medications directly into a selected portion of a medication receptacle.

BRIEF DESCRIPTION OF THE DRAWINGS

FIG. 11 is an elevational view showing an exit funnel portion system of the present invention.

FIG. 12 is a top plan view showing the top surface of a medication cart and a exposed medication bin.

BEST MODE FOR CARRYING OUT THE INVENTION

Figure 1:
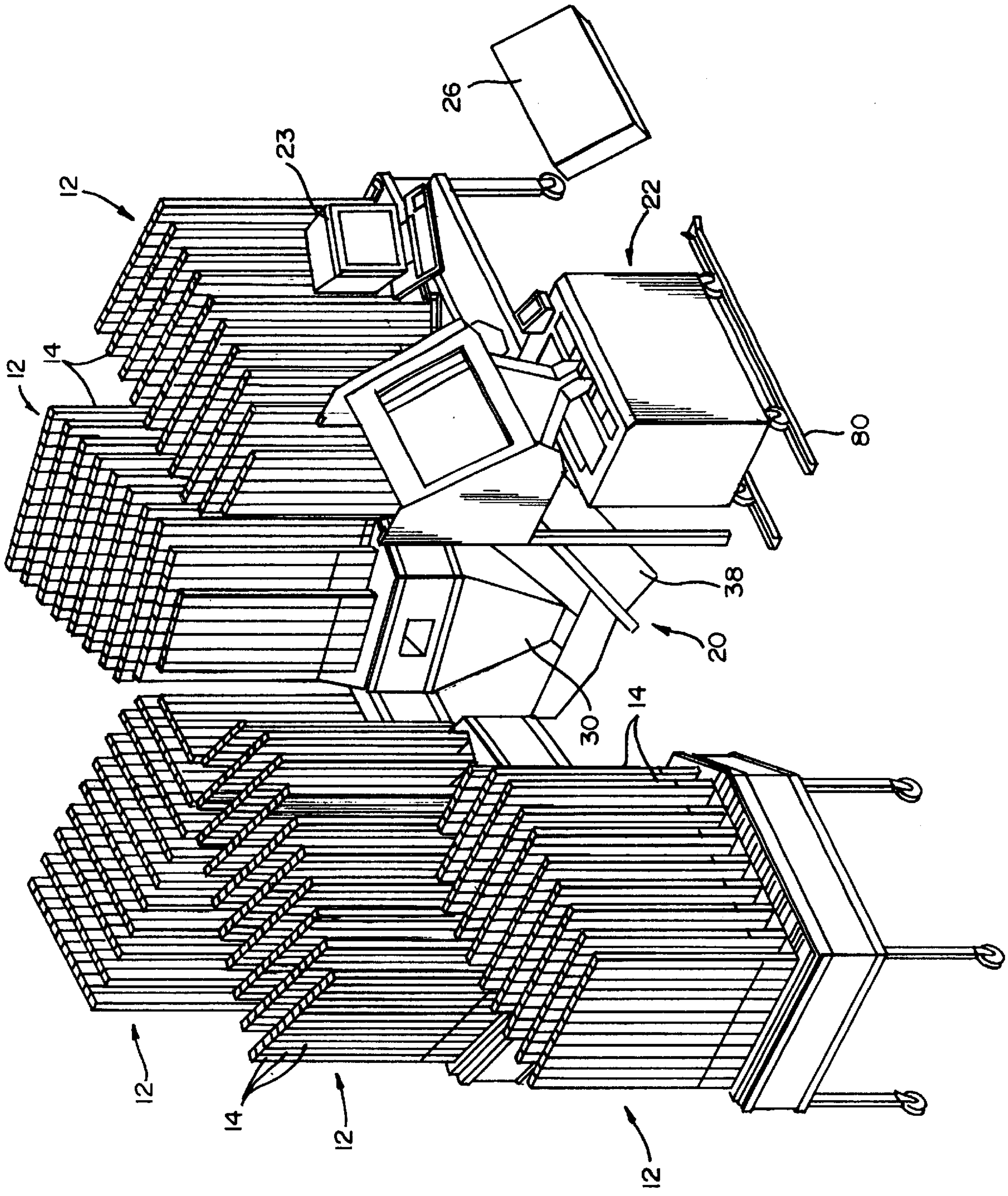
FIG. 1 is a schematic view showing a complete medication dispensing and delivery system which incorporates the medication handling system of the present invention.
Figure 2:
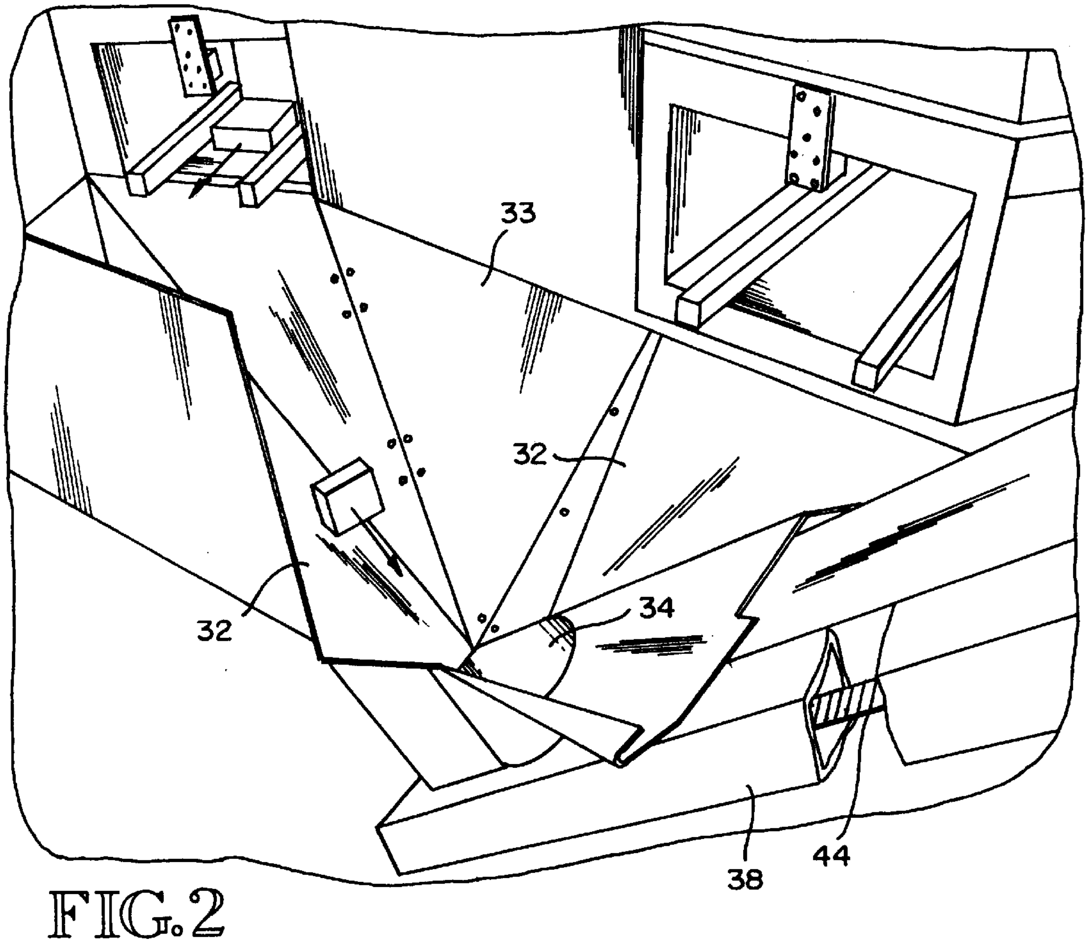
FIG. 2 is a partially cutaway view of a portion of the system of FIG. 1.

FIG. 1 shows an automatic medication dispensing and delivery system which includes the medication handling system of the present invention. The medication handling system disclosed herein receives medications which are automatically provided from a plurality of medication storage assemblies or vaults and then transports and loads those medications into, for instance, patient or medication bins in a medication cart which can in turn be transported directly to a hospital ward, where the medications are administered to the patients. The system can also be used to load medications into other open containers, including various bin styles and envelopes.

The automatic medication system 10, shown in FIG. 1, includes five separate medication storage assemblies or vaults 12—12. In the particular embodiment shown, each storage assembly includes a large number of individual medication storage cartridges 14—14, with each storage cartridge containing only one type of medication. Each medication in the cartridge is typically enclosed within a uniform-size package. Each of the storage cartridges 14 includes a delivery control mechanism at a lower end thereof which is automatically controlled to release a single package from the cartridge upon a signal command. The released packages fall into a trough member located below each medication vault, and are then moved by a sweeper element to a central loading assembly.

Such a system is more fully described in co-pending U.S. patent application Ser. No. 09/085,968, now U.S. Pat. No. 6,219,587 owned by the same assignee as the present invention. It should be understood, however, that the dispensing system described above is only one example of an automatic medication dispensing system and does not form a part of the present invention. Various arrangements of medication dispensing systems may be used with the present invention.

The dispensing system typically will contain various drugs, as well as other useful medical supplies, such as syringes, etc. The term "medications" used hereinafter is intended to include both medications per se, i.e. drugs, as well as medical supplies, such as syringes, etc.

The medications are dispensed to a medication transport and loading assembly, referred to generally at 20, which then moves the medications to and loads the medications into a medication receptacle, which in one example is a medication bin in a medication cart, shown generally at 22. Various "open top" containers could be used with the system of the present invention, however, including various bin configurations in different cart arrangements and various envelope configurations. The entire assembly 20 is hereinafter referred to as a medication handling system or medication loading system. The system is under the control of a computer 23 and appropriate control software therein. The loading assembly 20 transports successive groups of selected medications, each group for a single patient or in some cases a single unit-of-use medication, such as a starter dose, and loads them into selected bins or portions thereof present in cart 22.

Cart 22 will typically include a plurality of individual medication bins which are adapted to receive the individual groups of medications. In one particular case, the bins are elongated members which are semi-cylindrical in cross-section and which extend for the length of the cart. The bins are supported to move within the cart under software control. When a selected bin is at the top of the cart, it is exposed by opening doors or the like in the top of the cart immediately above the selected bin. The medications can then be conveniently removed from the cart by a nurse or other person administering the medications. The movement of the bins within the cart is controlled so that each bin can be individually brought to the loading/unloading position.

As can be seen from FIG. 1, each medication bin is divided into a plurality of equal length sectors. In the cart shown in FIG. 1, each medication bin has a total of nine such sectors. A divider may be positioned between adjacent sectors, so as to physically separate the successive sectors. Two or more individual adjacent sectors can together form a larger portion of the bin. The term "cell" is used herein to refer to one or more sectors, defined by dividers, depending upon the size needed for a particular patient. Cells can be assigned to individual patients or individual medications.

The loading system of the present invention is capable of moving selected medications into selected cells. The location of each cell (the correct bin and location within the bin) associated with each patient (for patient-specific bins) is maintained in memory in the control portion 23 of the overall system.

Besides delivery and loading of medications into cart 22 received from the storage assemblies or vaults 12—12, supplemental medications, not available from the storage assemblies 12, are provided by a supplemental doses assembly 26. These supplemental medications are available typically in the central pharmacy from which the storage assemblies themselves are periodically filled. They are not prescribed sufficiently often, however, to warrant a separate storage cartridge of their own in the automatic dispensing system. When needed, these medications are hand-picked from the stores in the central pharmacy and loaded into supplemental doses assembly 26.

In the embodiment shown, the supplemental doses assembly 26 fits onto the front end of the loading assembly 20, close to the funnel-like portion 58 leading to the bins in the cart. FIG. 1 shows it exploded away from the funnel portion. The supplemental doses assembly 26, which will be described in more detail below, includes a tray-like arrangement of compartments, each of which has an independently controlled access door. When a particular medication cart 22 is to be filled by the automatic system shown in FIG. 1, any medications not present in the storage vaults will be provided by the supplemental doses assembly 26.

The supplemental doses assembly 26 is controlled so that as a particular patient's dispensed medications are transported to the bin filling portion of the present system, the appropriate compartments on the supplemental doses assembly containing the prescribed additional medications for that patient are opened, releasing those medications into the bin filling portion of the system, joining with the medications dispensed from the storage vaults.

FIGS. 1–4 show a receiving assembly portion 30 of the loading system 20. The receiving portion 30 includes a series of trough-like funnels 32, which extend from the ends of the medication troughs beneath each of the vaults, and deflectors 33 which join adjacent funnels 32, all sloping downwardly and leading to a collector member 34 which is a short, square section, approximately 8 inches square, through which the medications dispensed from the storage vaults fall, by gravity action.

The various portions of the receiving assembly can be altered in configuration and arrangement to accommodate the particular arrangement of the storage vaults being used. The medications, upon being swept out of the medication troughs beneath the storage vaults, simply continue to move/fall by gravity action along the funnel/deflector assembly and then through the collector member 34 into the lower end 39 of a transport tube 38.

Transport tube 38 has an opening 41 in its upper surface near a lower end 39 of the tube. Opening 41 is in registry with and is approximately the same size or slightly larger than the collector member 34 immediately above it. Transport tube 38 is so arranged that the medications, upon being moved from the medication vault troughs, simply fall into tube 38 without being caught or hung up on the funnel/deflector assembly.

In the embodiment shown, transport tube 38 is 9 inches square by 72 inches long and is made from stainless steel. Lower end 39 of transport tube 38 is typically positioned either on the ground or a short distance above the ground. As indicated above, transport tube 38 extends at an angle of approximately 45° away from the medication vaults. The angle could typically be in the range of 35°–55°. In the embodiment shown, rear end 39 of transport tube 38 is approximately 24 inches below the bottom of the medication troughs beneath each vault. If the medication assemblies are sufficiently elevated, however, the transport tube need not be inclined.

Positioned within transport tube 38 is a stainless steel plunger 42. In the embodiment shown, plunger 42 is 8.75 inches square, so that there is approximately ⅛ inch clearance between the peripheral edge of the plunger and the internal surface of the transport tube. An air cylinder 44 moves the plunger within transport tube 38 under computer control. When the prescribed medications for a particular patient are received through opening 41, plunger 42 is at the lower end 39 of the tube. When all the medications of a patient are in the tube, air cylinder 44 is activated, moving the plunger up the length of the transport tube, passing several spaced sensors in its trip. A total of four sensors 48, 49, 50 and 51 are positioned along the length of transport tube 38, with sensors 48 and 51 being located approximately at the lower and upper ends thereof, while sensors 49 and 50 are located approximately 12 inches from each end.

In the embodiment shown, sensors 48–51 are Hall effect sensors, but other types of sensors, including reed switches, could be used as well. When plunger 42 is activated, following arrival of medications within the tube, the speed of the plunger remains relatively slow, approximately 2 ft/sec, until the plunger passes sensor 49, which is located past the upper edge of opening 41. At this point, the speed of the plunger is increased by the plunger control to approximately 6 ft/sec, moving the medications in the transport tube 38 until sensor 50 is passed, at which point the movement of the plunger is again slowed to approximately 2 ft/sec.

Figure 4:
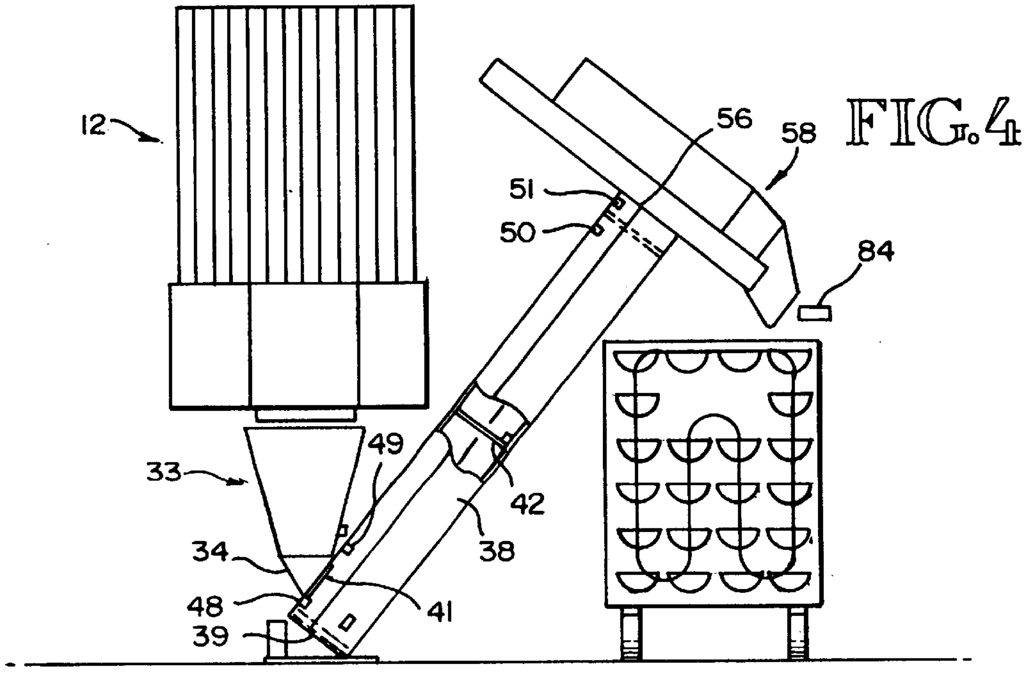
FIG. 4 is a side elevational view of the medication handling system of the present invention.
Figure 3:
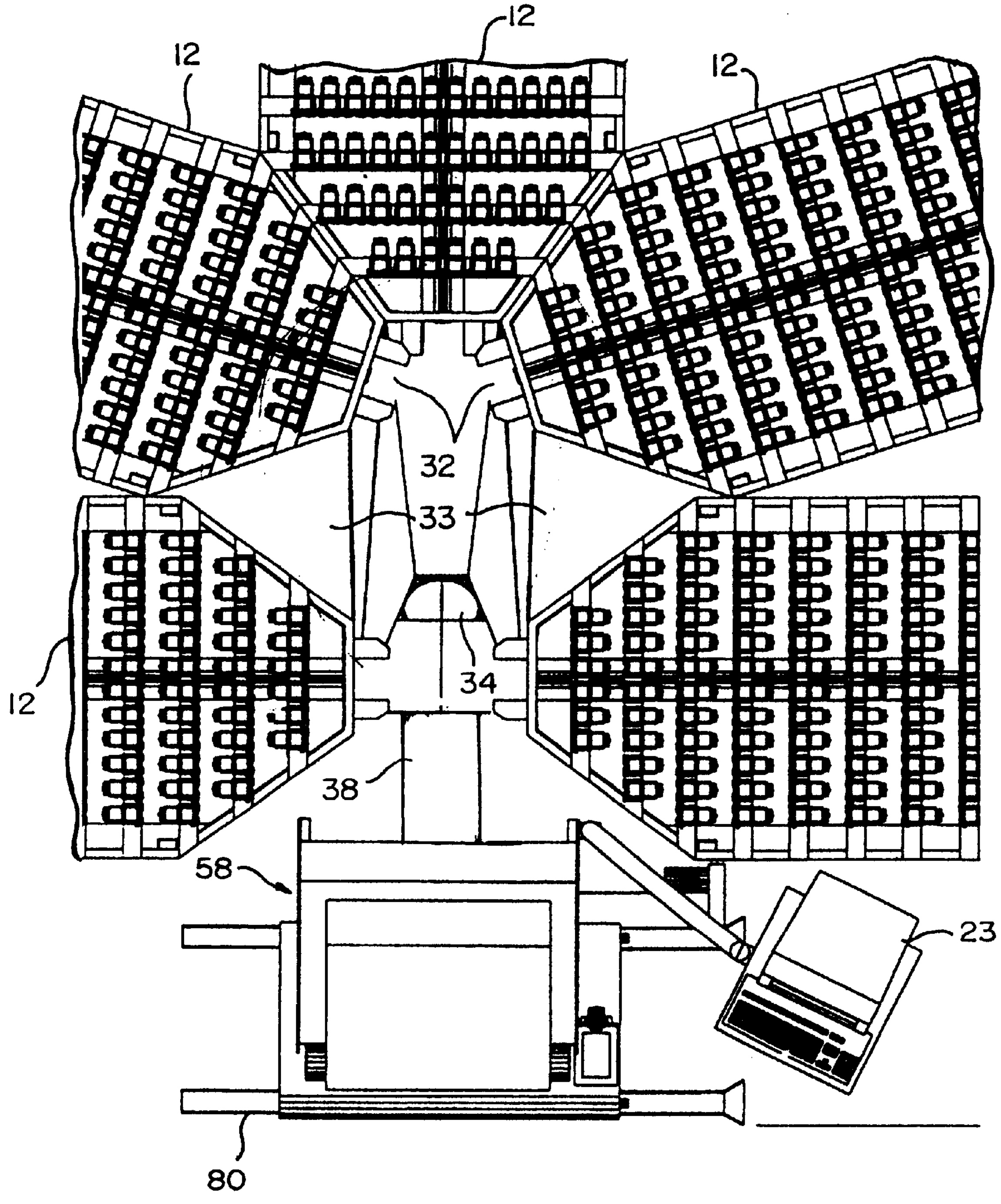
FIG. 3 is a top plan view of the system of FIG. 1.

The plunger moves to the upper end of the transport tube, where it reaches sensor 51, at which point the plunger is known to be in its uppermost position along the transport tube. When the plunger reaches its uppermost position, it pushes the medications over the upper edge 56 of the tube and into an exit funnel assembly 58 (FIGS. 4 and 11). The medications moved up the transport tube 38 are all for one particular patient or are individual non-patient-specific drugs. When the medications for one patient have been moved into the exit funnel assembly, the plunger is reversed by action of the air cylinder back down to its lowermost position, to await the next group of medications. This is all done quite fast, approximately 6 seconds per movement cycle.

Figure 5:
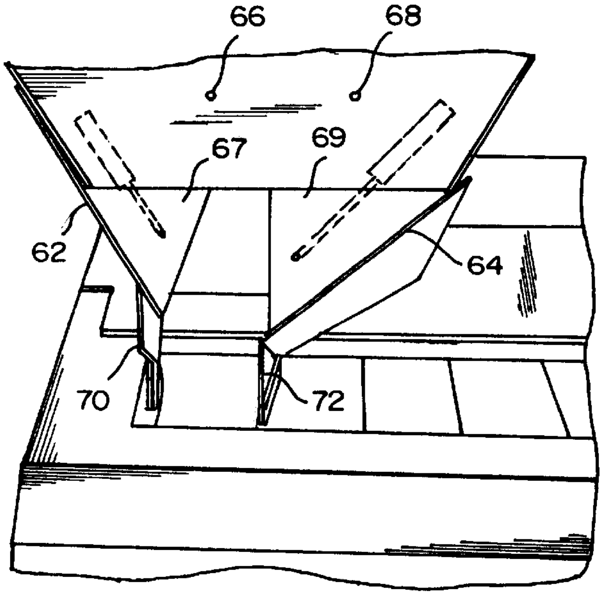
FIG. 5 is an elevational view showing one position of a portion of an exit funnel portion of the system of the present invention.

Exit funnel 58 (FIG. 11) is positioned approximately perpendicular to transport tube 38. In the embodiment shown, this is at least 34° from the horizontal. The angle is sufficient to result in the packages moving readily downwardly through the exit funnel structure, i.e. the angle is greater than the angle of repose for the packaged medications. In the embodiment shown, exit funnel 58 is a square box or tray, open at the top end where the medications are received, 30 inches on a side by 8 inches deep, made from stainless steel. Exit funnel 58 includes a flat back surface 59 and two opposing flat side walls 60 and 61. At the lower end of exit funnel 58, extending from the lower edges of sides 60 and 61, are opposing flat diverter members 62 and 64, each approximately 8 inches high. The diverter members are pivoted about pivot points 66 and 68, respectively, by flat pivot members 67 and 69 (FIG. 5).

Figure 6:
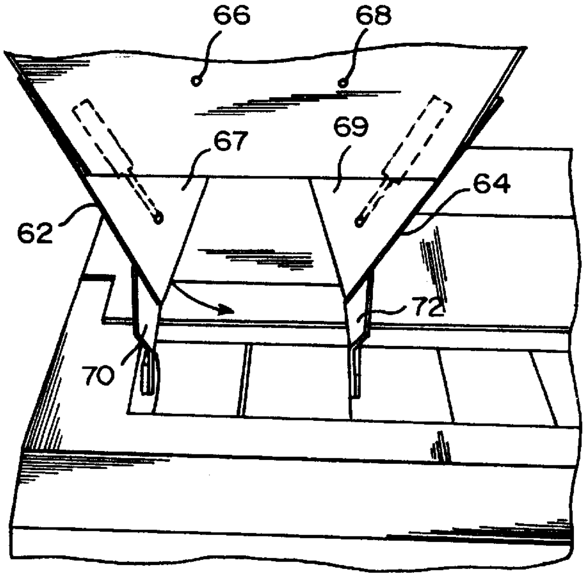
FIG. 6 is an elevational view showing the portion of FIG. 5 in a second position.
Figure 7:
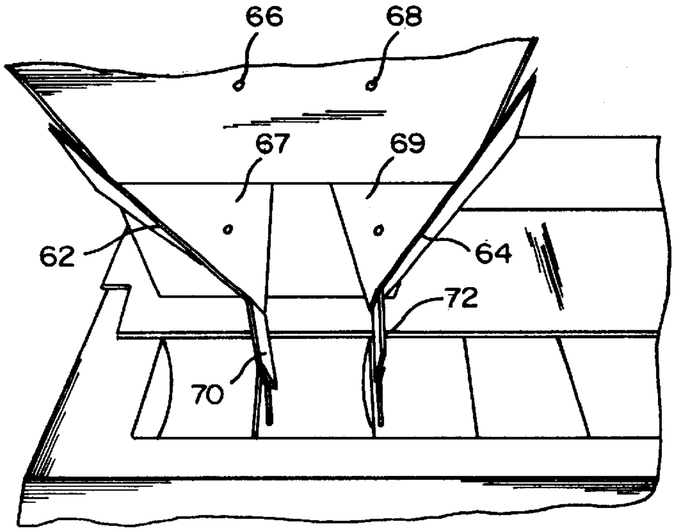
FIG. 7 is an elevational view showing the portion of FIGS. 5 and 6 in a third position.

In another embodiment, the diverters move directly toward and away from each other, by means of air cylinders. In their nominal position, the diverters 62 and 64 angle inwardly at an angle of approximately 65°. The diverters are controlled independently so that the lower end of each diverter can move to one side a distance of 3.5 inches. This arrangement allows for four different combinations of diverter openings at the lower end of the exit funnel, e.g. fully closed, fully open (7 inch wide opening), the right diverter opened 3½ inches to the right, and the left diverter opened for 3½ inches to the left. This is shown in FIGS. 5–7. At the bottom edge of each diverter are short, flexible flap members 70 and 72. The flap members are approximately 3.5 inches long and 1.4 inches high. They help to guide the medications into the medication bins.

This arrangement in the embodiment shown allows the loading system to fill a cell 73 (FIG. 12) comprising two adjacent sectors of 3.5 inches or two adjacent cells 77, 79 comprising one sector, each 3.5 inches, while the cart remains in a single position. Thus, in the embodiment shown, a single patient with a two sector cell, or two patients with one sector cells, can be filled while the cart remains in one position. It should be understood, however, that a variety of diverter arrangements can be used, with different cell and sector sizes. Typically, however, the opening at the lower end of the two diverter elements 62 and 64 will be such as to provide filling for at least one cell in each bin (for one patient) while the cart is in one particular position. While use of the structure described above, with movable diverters and a particular sector arrangement, permits the filling of more than one sector without moving the cart, it should be understood that such a capability is not necessary to the present invention.

A plastic lid 75 (FIG. 11) overlays part of the exit funnel structure, forming in effect a partial front panel surface, extending basically over the diverter elements. Lid 75 is hinged about its upper edge 76 to the lower end of the exit funnel box side walls 60 and 61. If, in operation of the system, medication packages become jammed within the exit funnel, particularly in the diverter portion, it is simple and fast for an operator to lift lid 75 and clear the jam by hand.

As discussed above and shown in the drawings, medications are loaded directly into bins situated within a medication cart. It should be understood, however, that the bin/cart arrangement shown is only one example of the possible devices into which medications can be loaded. In the overall system shown, the medication cart includes 22 bins, with each bin extending approximately the length of the cart. Each bin is supported and moved within the cart by a drive system so that the bins are presented successively at the top of the medication cart. The bins 69 are each divided into sectors, as previously explained, which in the embodiment shown are each 3.5 inches long, separated by dividers. Each patient is assigned a cell portion of a bin, which could be one, two or even more sectors (possibly the entire length of the bin). Only the boundaries of each cell have dividers, i.e. the dividers are used to divide adjacent cells.

Doors are provided in the upper surface of the cart and controlled so as to give access only to the particular cell associated with the patient being served. In typical operation, the present invention receives medications prescribed for each patient in the facility in turn from the automatically controlled medication storage vaults, moves these collected medications via a transport tube into the exit funnel assembly, from which they fall into the cell in a portion of a medication bin assigned to the patient. The cart is positioned as described below, and the bins within the cart are controlled so that the control computer 23 of the system knows that one particular portion of a particular bin assigned to a patient in fact contains medications dispensed for that patient.

A medication cart having generally the structure, arrangement and control capability referred to above is shown in U.S. patent application Ser. No. 09/204,814, now U.S. Pat. No. 6,170,829, which is assigned to the same assignee as the present invention. That application shows the details of a medication cart, the details of a bin arrangement and a mechanism for controlling the movement of the bins within the cart as well as access to the bins, so that the prescribed medications for a particular patient are available when requested, are under computer control. Access is provided to the nurse or other practitioner administering the medications by a series of controlled access doors at the top of the cart, which uncover only the portion of the bin assigned to a given patient.

It should be understood, however, that other cart arrangements and configurations can be used with the system of the present invention. In fact, one of the advantages of the present invention is that it can be used with medication carts of various configurations, as well as courier envelopes or the like, as long as the individual patient bins are accessible for loading of medications by the exit funnel structure of the present invention.

Figure 13:
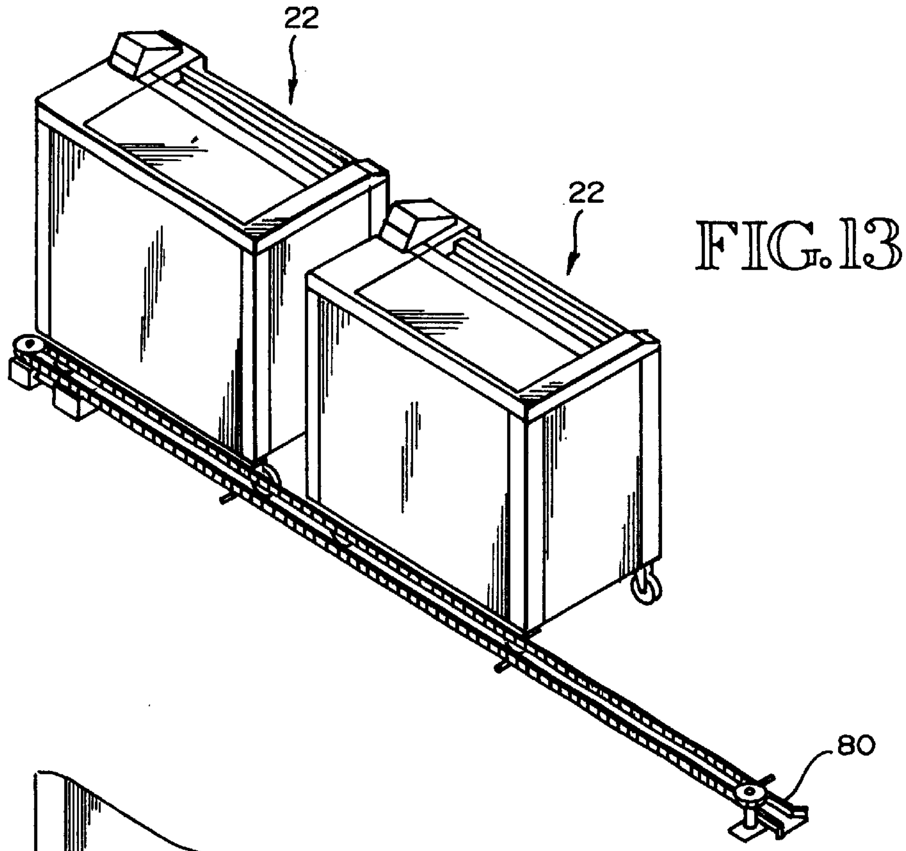
FIG. 13 is a perspective view showing a medication cart guiding system for use with the present invention.
Figure 14:
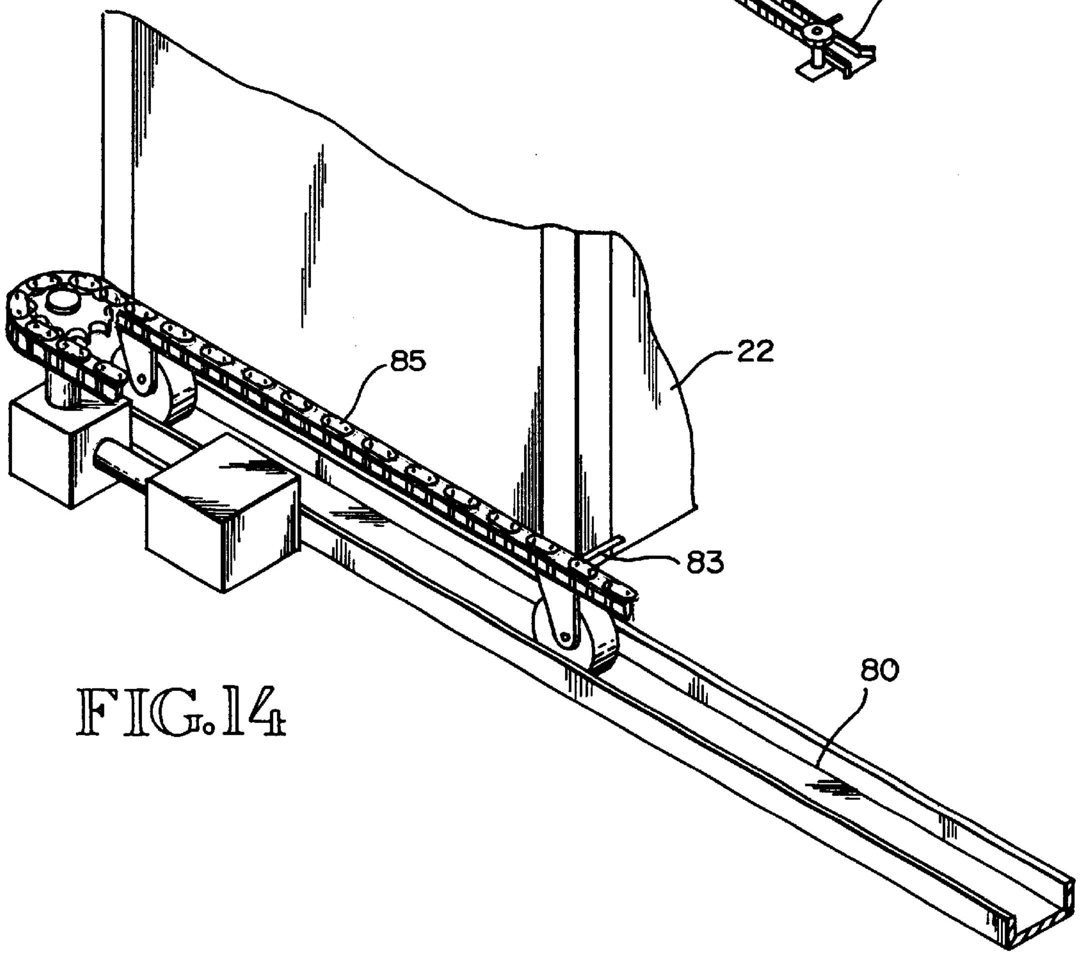
FIG. 14 is a perspective view showing a portion of the system of FIG. 13.

In the overall system, prior to loading of medications, a cart or carts 22 are positioned by hand on guide rail 80, as shown in FIGS. 13 and 14. A two-rail arrangement could also be used, as shown in FIG. 1. The wheels on the bottom of the cart ride on the rail. Referring to FIGS. 13 and 14, once a cart is positioned on the rail, it is locked to a carriage mechanism in a known home position by a pin 83, hook or the like. In the embodiment shown, an endless chain 85, driven by a stepper motor, is used to move the cart 22 in precise, known increments along the rail. An alternative arrangement to produce a precise movement of the cart is a lead screw. Other systems could also be used.

In operation, the cart is moved onto the guide rail by an operator and connected to the drive system in the home position, which is known by the control computer 23. The control system thus knows where the cart is in relation to the exit funnel structure 38 of the medication handling system and hence, the position of the medication bins within the cart as well relative to the exit funnel. The cart is then moved through a series of steps of known distance. When the first cell in a particular medication bin to be loaded is in proper position relative to the lower end opening in the exit funnel, the cart is locked into place. The medications for the patient assigned to that cell are then transported from the storage assemblies and loaded into that cell through the exit funnel.

As explained above, the medications fall by gravity into the cell. The diverters 62 and 64 on the lower end of the exit funnel have been properly positioned to produce a feed of the medications into the correct cell in the medication bin or other receptacle. An overheight sensor 84 on the cart checks to ensure that all medications are within the height of the bin. If not, an alarm is generated, so that an operator can correct the situation. Alternatively, the overheight sensor could be positioned on the diverters. In the embodiment shown, two adjacent 3.5 inch sectors can be filled, either for one patient or two patients, without moving the cart. For the 7.0 inch cell, both diverters must be fully open.

In the embodiment shown, after a first cell in a particular bin is filled, the bins are moved so that the next bin in the bin sequence is moved into position for filling. After the first cells in each bin have been filled, the next set of cells for all of the bins is filled. This continues until all the cells in all the bins in the cart have been filled. Then, the operator will release the cart from the guide rail system and move the cart away from the loading system. The next cart is then moved onto the rail system and attached to the carriage in the home position. The filled cart is moved up to the appropriate ward for administration of the medications to the patients.

Figure 8:
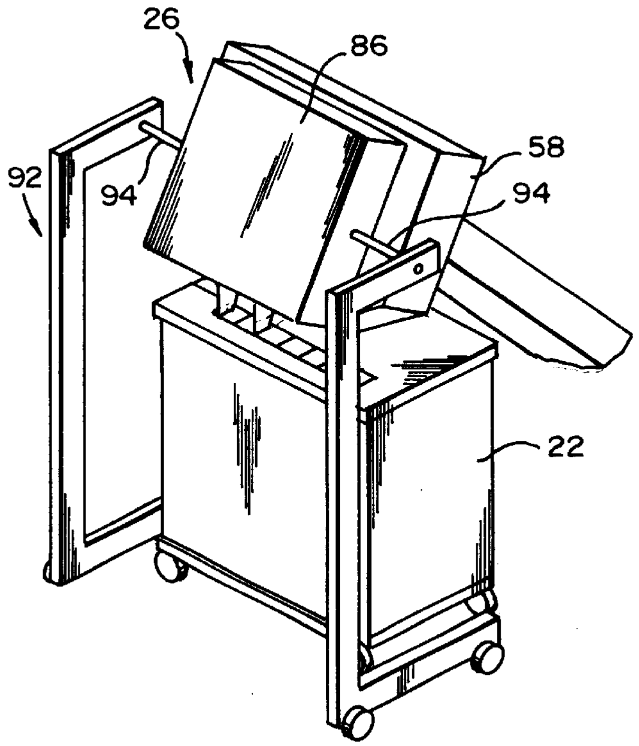
FIG. 8 is a perspective view showing a supplemental doses assembly in conjunction with the medication handling system of the present invention.
Figure 9:
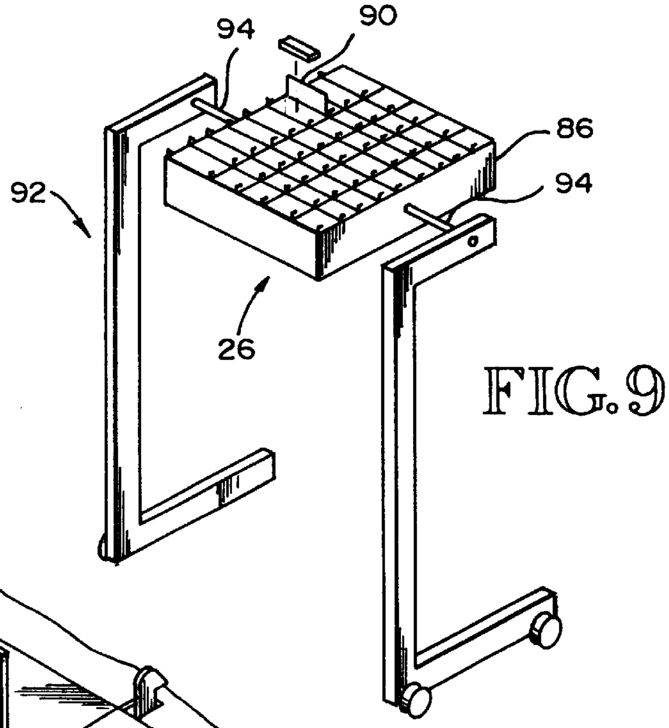
FIG. 9 is a perspective view showing the supplemental doses assembly of FIG. 8.
Figure 10:
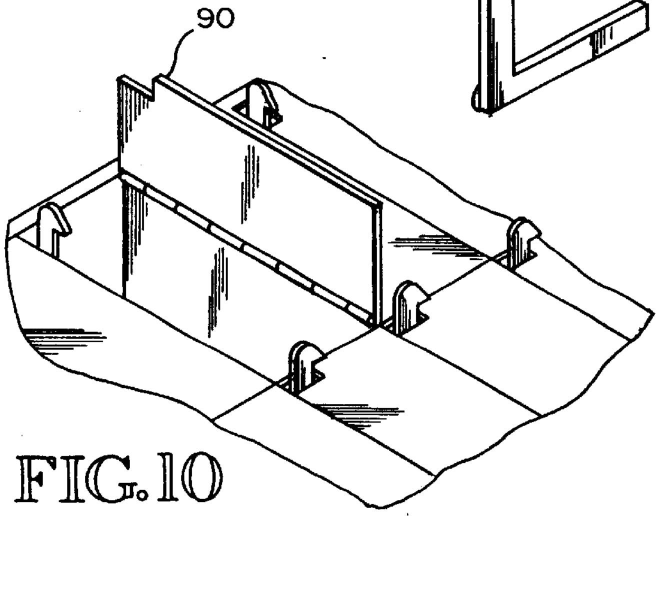
FIG. 10 is a perspective view showing in more detail a portion of the supplemental doses assembly of FIG. 9.

FIGS. 8–10 show the supplemental doses assembly 26. In the embodiment of FIGS. 1–4, the supplemental doses assembly comprises a tray-like structure, shown generally at 86, which is divided into a number of separate compartments by a plurality of divider walls. The compartments are arranged to be of different sizes to accommodate different size medication packages and other medical supplies. Each of the compartments is closed on all sides, except for one, by the compartment walls and a bottom plate. The otherwise open side of each of the compartments has hinged doors 90—90 which are used to close off the compartments. The doors 90 are controlled to be individually openable with an electrical signal command, by means of solenoids or the like.

The assembly 26 is shown with its access side up in FIGS. 9 and 10, showing the compartments and the movement of the access doors. The door side of the assembly in the embodiment shown is positioned over the exit funnel assembly 58, as shown generally in FIG. 1, during loading of the medications into the medication bins. In one embodiment, the assembly is supported on a separate frame 92 by means of opposing pins 94 on which the assembly is rotatable. Another set of spring-loaded pins (not shown) are used to fix the assembly in a particular position.

When the supplemental doses assembly is to be filled, frame 92 is moved away from the cart and the two position pins are pulled away and the assembly is rotated 180° about opposing pins 94—94 to provide access to the compartments. All the doors are then opened and those medications which are to be loaded in the assembly are loaded into the various compartments. Those medications are typically preselected by hand from the central pharmacy.

In typical operation, each of the medications picked will have a bar code or similar identifier on the packaging. This bar code will be scanned by an operator using a bar code reader; the package will be placed in a particular compartment, which also has an identification. This identification is also scanned, so that the location of the supplemental medications in the supplemental doses assembly is known. This information is provided to the central computer. In some systems it will not be necessary to have an identifier on the compartments.

After all of the supplemental medications for an entire cart have been loaded, the assembly is rotated again, fixed in position, and moved back against the exit funnel. Then as each patient's medications are dispensed from the storage assemblies in turn and moved into the exit funnel, the doors on the compartments containing the medications for that patient are opened automatically and fall into the exit funnel. Thus, the assembly in the embodiment shown is an automatic supplemental doses assembly. The combined medications move by gravity down into the appropriate patient cell in the cart.

While the embodiment shown has the supplemental doses assembly supported on a movable frame, the frame assembly can be supported on the exit funnel structure itself. The supporting pins 94 can be made slidable along a track so that the assembly can be moved away from its operating position against the exit funnel, rotated for filling, and then moved back for actual use. In operation, the supplemental doses assembly is filled at the beginning of each run, i.e. all of the supplemental medications for patients in a given medication cart are loaded at one time.

An alternative location for the supplemental doses assembly is in the vicinity of the storage vaults. In such an arrangement, the supplemental medications fall down a separate funnel structure into the transport tube, like the other medications. This alternative arrangement may be more convenient and easier to manipulate than the arrangement shown in FIG. 1 and discussed above.

Figure 15:
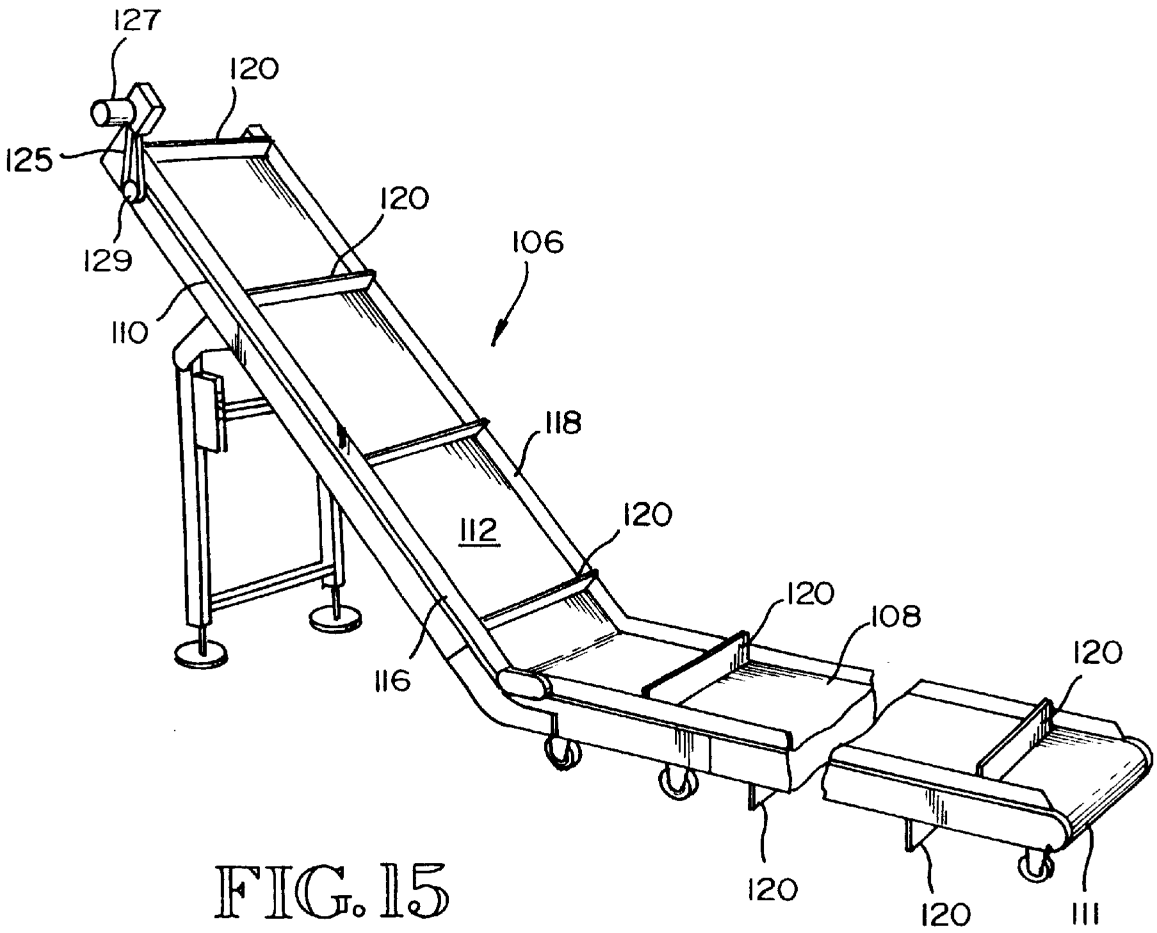
FIG. 15 is a perspective view showing an alternative embodiment of the medication handling system of the present invention.
Figure 16:
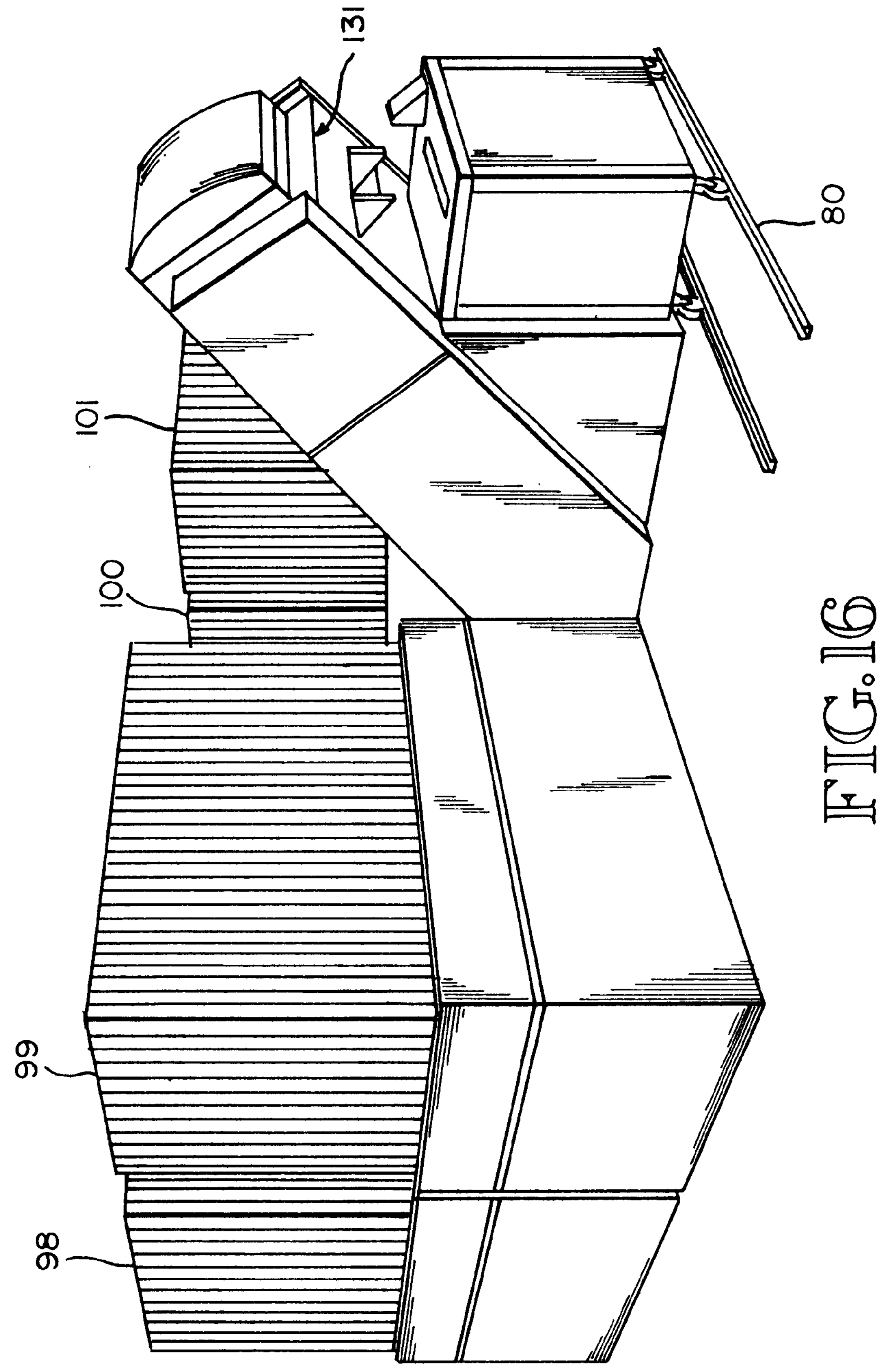
FIG. 16 is a schematic view showing a complete medication dispensing and delivery system for the embodiment of FIG. 15.
Figure 17:
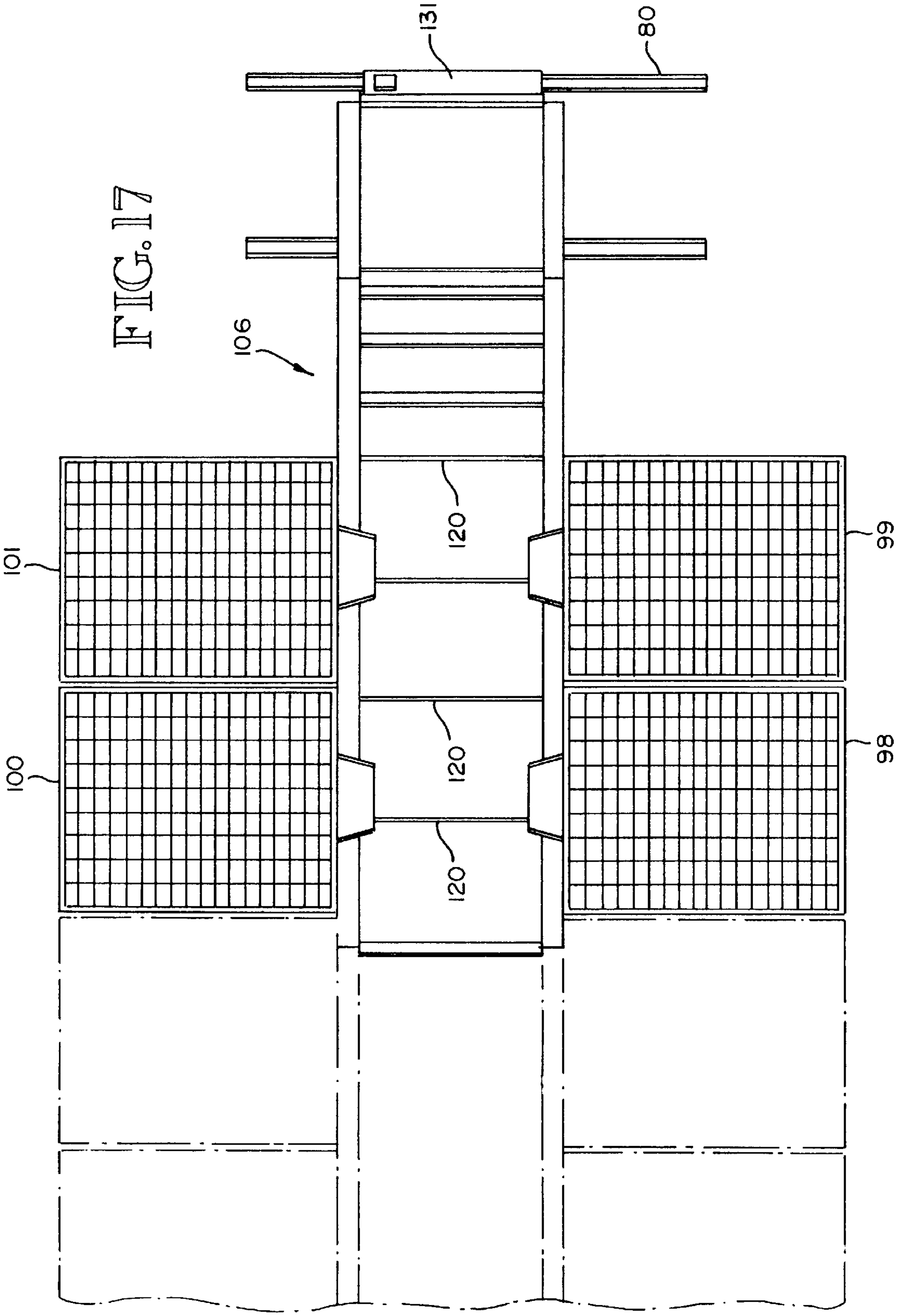
FIG. 17 is a top plan view of the system of FIG. 16.

FIGS. 15–17 show another embodiment of the transport/loading system of the present invention, which in many situations will be preferred. In this embodiment, the medication vaults, which each comprise a plurality of automatically controlled individual storage cartridges, are generally rectangular in shape. Each vault contains approximately 150 cartridges, although this can be varied. In FIGS. 16 and 17, four such medication vaults or assemblies are shown at 98–101. Generally, as will be clarified hereinafter, these medication vaults are provided in opposing pairs with as many pairs of vaults as may be required. This overcomes a disadvantage with the embodiment of FIGS. 1–4, in which the number of medication vaults is limited by the particular geometric arrangement of that embodiment In the embodiment of FIGS. 15–17, the collecting mechanism and the transport tube are replaced by a conveyor, shown generally at 106. The conveyor 106 has a horizontal portion 108 and an inclined portion 110. Medication vaults are positioned on opposite sides of the horizontal portion 108. The length of horizontal portion 108 will vary, depending upon the number of vaults used in the system. Medications from the storage vaults will be moved onto the conveyor 106 through individual medication funnels. The funnels are actually simpler and more straightforward than in the embodiment shown in FIGS. 1–4. The funnels simply direct the medications dispensed automatically from the storage assemblies onto the conveyor 106.

A supplemental doses assembly can also be positioned along the horizontal portion 108 of the conveyor at a selected location, preferably at the rear end (start) 111 thereof, where access to the supplemental doses assembly is more convenient for hand-loading. The supplemental doses assembly can be positioned on a frame which would extend over the conveyor. The supplemental doses assembly tray can be similar to that shown in FIG. 7, rotatably mounted on supporting pins on the frame.

The conveyor will vary in the length of the horizontal portion 108, but will be approximately 18 inches wide over its entire length. Typically, the conveyor will be made of rubber, and will be supported at various points along its length. The conveyor will have an upper surface 112 upon which the medications are positioned, and a lower "return" surface which is separated from the upper surface by a few inches.

Along the sides of the conveyor are short, opposed walls 116 and 118 which retain the medications on the conveyors. Positioned laterally across the conveyor at selected points along the length of the conveyor are vertical flights 120—120, which are typically positioned every 24 inches. Flights 120 are in the embodiment shown approximately 3 inches high. The conveyor in the embodiment shown is driven by a belt 125 with a stepper motor 127, the belt engaging conveyor driving wheels 129 which are positioned at the top of the conveyor.

As the conveyor moves, the medications move along the horizontal portion 108 of the conveyor, up the inclined portion 110, and then are dropped into the exit funnel structure 131, which is identical to the exit funnel structure shown in FIG. 1. The exit funnel 131 includes diverter arms similar to that shown in FIGS. 5–7. The arrangement of FIGS. 15–17 has some advantages over the embodiment of FIGS. 1–4, in that it is generally simpler in structure and operation and has the further advantage of being able to accommodate a variable number of automatic medication-dispensing vaults, depending upon the number necessary for a particular health care facility. For instance, two opposing vaults could be used for a smaller facility, while six or even more vaults could be used for a large facility. Also, it is easy to accommodate a supplemental doses assembly along the horizontal portion of a conveyor instead of adjacent the exit funnel, although the supplemental doses assembly could be positioned at that location as well in this embodiment, if so desired.

Hence, a medication dispensing system has been disclosed which collects medications, typically patient-specific medications, which have been automatically dispensed from several medication vaults and moves them in a simple, reliable manner to an exit funnel which in turn directs them into patient-specific portions of a medication bin in a medication cart. The medication cart can then be moved directly to the patient's bedside. Typically, the medication cart will have the medications for all patients located within a particular area, such as a ward. The present invention is thus a medication handling system which is typically used intermediate of an automatic medication dispensing system and a medication cart, which moves the medications to the patient. The invention could be used, however, with other medication containers, such as different kinds of receptacles, including courier envelopes or transport bins.

Although a preferred embodiment of the invention has been disclosed herein for illustration, it should be understood that various changes, modifications and substitutions may be incorporated in such embodiment without departing from the spirit of the invention, which is defined by the claims as follows.

What is claimed is:

1. A system for handling preselected, packaged medications dispensed from a plurality of storage assemblies, comprising:

a medication-receiving assembly for collecting medications which have been dispensed from a storage assembly therefor; and means for transporting the collected medications to a medication loading assembly, the transporting means including an endless conveyor having a first portion and an upwardly directed second portion, wherein the first portion is arranged such that a plurality of medication-storing assemblies can be brought adjacent the first portion, permitting medications to be dispensed from the medication-storing assemblies directly onto the conveyor, the conveyor including a plurality of elements along the length thereof for spacing dispensed medications and means for moving the conveyor so as to transport medications thereon to the medication loading assembly, wherein the medication loading assembly is positioned relative to the conveyor and is configured so that the packaged medications move by gravity out of a lower end of the loading assembly to a selected medication receptacle in a medication cart having a plurality of medication receptacles, the lower end of the medication loading assembly being configured so as to guide the packaged medications directly into a selected portion of the selected medication receptacle.

2. A system of claim 1, wherein the medication receptacle is a medication bin.

3. A system of claim 2, including a pair of opposing deflectors at the lower end of the loading assembly for guiding the medications into the medication receptacle.

4. A system of claim 3, including means for controlling the position of the deflectors so that more than one portion in a medication bin can be filled with medications without moving the medication cart.

5. A system of claim 4, including flexible, flat portions extending from free ends of the deflectors to ensure that medications fall into the selected portion of the medication bin.

6. A system of claim 3, wherein the deflector means includes a pair of opposed diverter arms which are mounted to move toward and away from each other, increasing/decreasing an exit opening at a lower end of the loading assembly.

7. A system of claim 6, including a removable lid overlying the opposed diverter arms which can be moved so as to permit convenient access to the loading assembly in the diverter arms area.

8. A system of claim 1, wherein said selected portion is associated with a particular patient and said packaged medications have been prescribed for said particular patient.

9. A system of claim 1, wherein said selected portion is medication-specific.

10. A system of claim 9, wherein the incline is within the range of 35°–55°.

11. A system of claim 9, wherein the incline is at such an angle that the packaged medications move freely by gravity out of the loading assembly into the medication cart.

12. A system of claim 1, wherein the transporting means is inclined upwardly between the receiving assembly and the loading assembly.

13. A system of claim 1, wherein the receiving assembly includes a funnel arrangement down which the received medications move by gravity onto the transporting means.

14. A system of claim 1, including a supplemental doses assembly positioned adjacent the loading assembly for adding selected medications not available from the storage assemblies.

15. A system of claim 14, wherein the supplemental doses assembly includes a plurality of compartments capable of receiving medications, each compartment having a controllable compartment door, which when activated opens so that any medication therein moves into the loading assembly.

16. A system of claim 15, wherein the compartment doors are controllable such that only those compartment doors which contain supplemental medications for a particular patient are opened in conjunction with medications for said patient being dispensed from the medications vaults, so that the supplemental medications and the dispensed medications are directed together into the medication bin.

17. A system of claim 1, including a supplemental doses assembly located above the first portion of the conveyor.

18. A system for handling preselected, packaged medications dispensed from a plurality of storage assemblies, comprising:

a medication-receiving assembly for collecting medications which have been dispensed from a storage assembly therefor; and means for transporting the collected medications to a medication-loading assembly, the transporting means being in the form of an upwardly inclined tube, and including a pusher element which has an outline slightly smaller than the tube, the transporting means further including a powered member which moves between opposing ends of the tube for moving medications which have fallen into the tube at lone end thereof to an opposing end of the tube, where they move into the loading assembly, wherein the medication-loading assembly is positioned relative to the conveyor and is configured so that the packaged medications move by gravity out of a lower end of the loading assembly to a selected medication receptacle in a medication cart having a plurality of medication receptacles, the lower end of the medication loading assembly being configured so as to guide the packaged medications directly into a selected portion of the selected medication receptacle.

* * * * *